Oct. 29, 1957

G. KALISTA 2,811,378

HEAVY TENSION LOAD SAFETY SWIVEL

Filed Dec. 15, 1953

INVENTOR.
GEORGE KALISTA
BY
ATTORNEYS

United States Patent Office 2,811,378
Patented Oct. 29, 1957

2,811,378

HEAVY TENSION LOAD SAFETY SWIVEL

George Kalista, Springfield, Mass.

Application December 15, 1953, Serial No. 398,454

3 Claims. (Cl. 287—91)

(Granted under Title 35, U. S. Code (1952), sec. 266)

The invention described herein may be manufactured and used by or for the Government of the United States of America for governmental purposes without the payment of any royalties thereon or therefor.

This invention relates to swivels and more particularly to free running ball bearing type swivels that will support loads with an appreciable greater factor of safety.

It is an object of this invention to provide a free running swivel that will insure against swivel member separation in the event of bearing failure under loading.

Another aspect of this invention is to provide a swivel which has enclosed thrust bearings with a safety shoulder thereby limiting axial displacement of the swivel elements under excessive loading.

A further object of this invention is to provide a separable swivel with a safety shoulder which will be engaged by the displaceable member of the swivel upon internal structure fracture.

Still another object is to provide a swivel construction wherein multiple bearing races may be employed to give increased load bearing characteristics but wherein the swivel parts cannot separate even upon bearing failure.

Other objects and many of the attendant advantages of this invention will be readily appreciated as the same becomes better understood by reference to the following detailed description when considered in connection with the accompanying drawings wherein.

Figure 1:
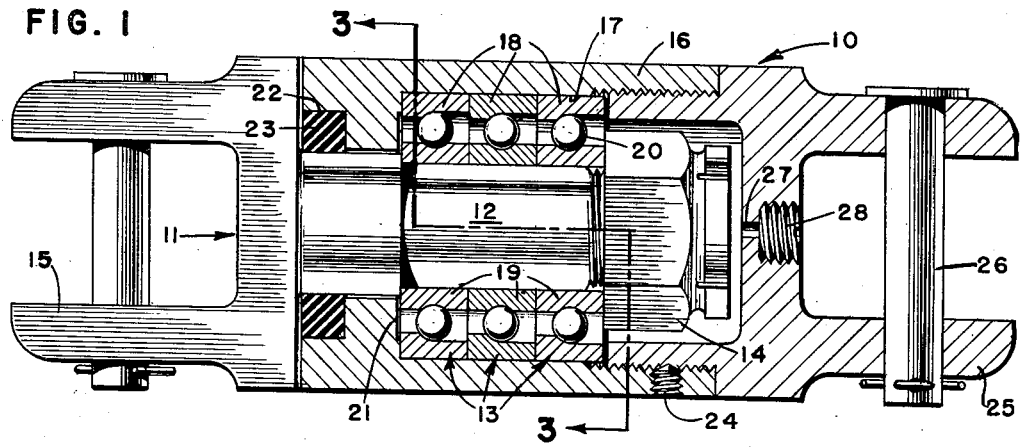
Fig. 1 is a side elevation, partially in section, of one form of swivel embodying the present invention.
Figure 2:
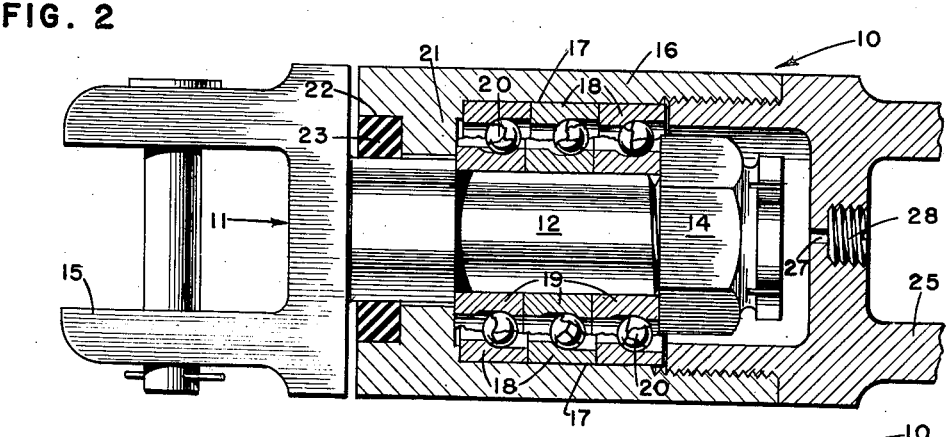
Fig. 2 is a view substantially similar to Fig. 1 illustrating coaction of swivel members after one form of thrust bearing failure.

Referring to the drawings, in which like numerals designate like parts, there is illustrated a device constructed in accordance with the present invention which comprises the female socket member 10 in which the male member 11 of the swivel may freely rotate. The male member 11 of the swivel has an axial shaft 12 which has a reduced shank to accommodate a plurality of antifriction thrust bearing members 13, three of which are shown. This shaft is threaded at one end to engage a load bearing nut 14 within the recess 17 of the female socket member 10. The line engaging portion of the male member 11 opposite the end from which the axial shaft 12 projects is illustrated in the form of a clevis joint 15, however, this may take the form of any conventional securing element as an eye, a hook, or a stud.

The female socket member 10 constitutes several components to form a compact cylindrical housing for the thrust bearing members 13 and the axial shaft 12. A bearing retainer sleeve 16, internally threaded at one end, is bored to receive a plurality of thrust bearing outer races 18 which will receive the distributed axial loads from the female and male members 10 and 11. The outer races 18 of bearing members 13 are accommodated within the cylindrical recess 17 of the bearing retainer sleeve 16 and the inner races 19 are mounted on the axial shaft 12. The ball elements 20 between inner and outer races provide the requisite free rotation between the shaft 12 and the sleeve 16 as well as to provide the medium for translating and distributing the axial load to the supporting load bearing outer races 18.

Axial movement and displacement of the outer races 18 is restricted by the annular shoulder 21 protruding inwardly from the cylindrical bearing sleeve 16 and radically spaced from the shaft 12 to provide the requisite clearance for rotation therebetween. The shoulder 21 is recessed as shown to provide a clearance between the annular shoulder and the inner races 19 permitting free rotation of the elements 10 and 11 through the bearing members 13. Parting of the swivel members 10 from 11 is prevented even after failure of all of the ball bearings 20 by the inner races 19 buttressing against the shoulder 21. Although the free swiveling action normally present between the elements 10 and 11 will no longer be present upon fracture of the ball bearings 20, the fact that adequate bearing surface on the shoulder 21 is provided on which the inner races 19 may bear will enable the swivel to sustain axial loads greatly in excess of the design limitations of the ball bearings 20 thus providing an increased safety factor for the swivel.

Beyond the shoulder 21 on the sleeve 16 a sealing ring recess 22 is provided to accommodate a suitable sealing ring 23 which will prevent contamination of the bearing elements as well as provide a seal to retain a suitable lubricant for the bearing elements. Threadedly engaging the internally threaded end of the bearing sleeve 16 and locked in position by set screw 24 is a suitable cable coupling device shown as a clevis joint 25 and pin 26, however, the coupling may be in the form of an eye, a hook or a stud member or the equivalent thereof.

Lubrication for the bearing member is provided through lubrication port 27 which is sealed by a screw plug 28.

Figure 4:
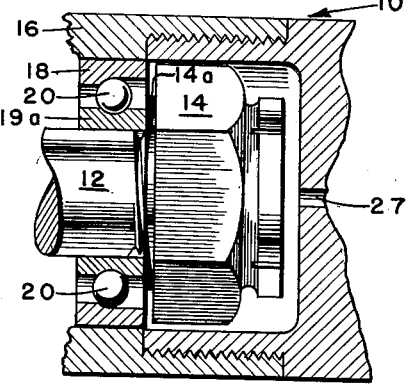
Fig. 4 is a fragmentary sectional view, somewhat enlarged of an embodiment wherein the load bearing nut overhangs both the outer and inner races.

A slightly modified form of the present invention is shown in Fig. 4 wherein the bearing side of nut 14 is undercut to form an abutment 14a thereon which will engage the inner race 19a. Sufficient clearance is provided for free rotation between the outer overlapping portion of the enlarged bearing nut 14 and the outer races 18. Fracture of the ball bearings 20 and possibly the inner race 19a will permit the enlarged bearing nut 14 to come into solid engagement with the outer races 18 which are buttressed against the annular shoulder 21 similar to that shown in Fig. 1.

Figure 3:
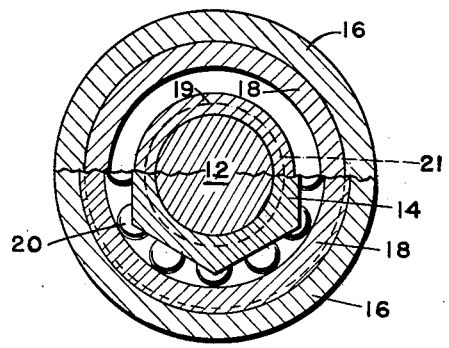
Fig. 3 is a transverse sectional view taken along a line substantially corresponding to line 3—3 of Fig. 1.

The relationship of the overlapping positions for Fig. 1 is illustrated in Fig. 3 wherein the innermost edge of the annular shoulder 21 (shown by the dotted circle) is overlapped substantially by both the inner bearing races 19 and the bearing nut 14. Increased overlapping by the bearing nut 14 over both the outer races 18 and the annular shoulder 21 is realized by utilizing the modified embodiment illustrated in Fig. 4.

In assembling the swivel for operation the sealing ring 23 is first pressed into the sealing ring recess 22 on the bearing retainer sleeve 16 and then the threaded end of the axial shaft 12 of the male member 11 is inserted into the bearing sleeve 16. The requisite number of thrust bearing elements suitable to carry the load application are then assembled on the shaft 12 within sleeve 16. The load bearing nut 14 is then threaded onto the end of shaft 12 to bear against the assembled inner races 19. Sufficient clearance and an overlapping spaced relationship is provided between the inner races 19 and the annular shoulder 21 to permit free rotation of the male member 11 within the bearing sleeve 16. Finally the threaded cable coupling device, shown as a clevis joint 25, is screwed into the bearing sleeve 16 and made secure by set screw 24.

Obviously many modifications and variations of the present invention are possible in the light of the above teachings. It is therefore to be understood that within the scope of the appended claims the invention may be practiced otherwise than as specifically described.

What is claimed is:

1. A swivel of the character described comprising a sleeve having a wall formed on one end and a centrally disposed well formed in the other end thereof, said wall having a bore of reduced diameter with respect to the diameter of said well and extending therethrough in communication with the well, a plurality of antifriction bearings disposed within said well in abutting engagement with respect to each other and having concentric inner and outer annular ball retaining elements respectively in radially spaced relation with respect to each other, the outer elements being in engagement with the wall defining said well, a clevis having a nipple formed thereon in threaded engagement with said wall, a shoulder on said sleeve in engagement with one of the outer elements, complementary means on said nipple in engagement with another one of the outer elements and cooperating with said shoulder for maintaining said elements within said well in said abutting engagement, a clevis device having a cylindrical member integrally formed therewith and disposed within said bore, a shaft integrally formed with said cylindrical member and disposed within the well in engagement with the inner elements whereby said clevis and clevis device are free to rotate with respect to each other, shoulder means on said cylindrical member in engagement with one of the inner elements, a nut threaded on one end of said shaft into engagement with another one of the inner elements and having a diameter larger than the diameter of said bore for invariably maintaining the inner annular elements locked between said nut and the shoulder means, and stop means on said sleeve cooperating with said one inner element for engaging said one element to prevent separation of said shaft and the sleeve in the event that said bearings are broken in response to an excessive load applied thereto.

2. A swivel of the character disclosed comprising a sleeve having a wall formed on one end and a centrally disposed recess formed in the other end thereof, said wall having a bore formed therein in communication with said recess, bearing means disposed within said recess, a shaft rotatably mounted in said bearing means and having an enlarged cylindrical member formed thereon and disposed within said bore, means on said sleeve and threaded into said recess in engagement with said bearing means for maintaining said bearing means within said recess, a shoulder formed at the junction of said shaft and cylindrical member for engagement with said bearing means, a nut threaded on one end of said shaft the diameter of which is larger than the diameter of said bore for invariably maintaining said bearing means in engagement with said shoulder, and stop means on said sleeve for cooperation with said bearing means and the nut for preventing separation of said shaft and sleeve in the event that said bearing means are fractured in response to an excessive load applied thereto.

3. A safety swivel of the character described comprising a load supporting male member including an axial shaft having a reduced cylindrical portion and an enlarged cylindrical portion of larger diameter than the diameter of said reduced portion, shoulder means formed at the junction of said shaft cylindrical portions, antifriction thrust bearing means mounted on said shaft and having one end thereof in engagement with said shoulder means, a female coupling member including a sleeve enclosing said bearing means and rotatable thereon relative to rotation of said shaft, said sleeve having a recess in one end for receiving said bearing means and a bore in the other end thereof in communication with said recess and of less diameter than the diameter of said recess for receiving said enlarged cylindrical portion, means including an internal annular shoulder on said sleeve and extending radially inwardly to engage said bearing means for supporting axial loads between said shaft and sleeve through said bearing means, a load bearing nut threaded on the reduced end of said shaft in engagement with the other end of the bearing means for invariably maintaining said one end of said bearing means in engagement with said shoulder means, stop means on said sleeve bordering on said bore and normally in mutually spaced relation with respect to said one end of the bearing means and in overlapping relation with respect to said bearing means and the load bearing nut for engaging said bearing means to prevent separation of said male and female members in the event that the bearing means are fractured in response to an excessive load applied thereto.

References Cited in the file of this patent

UNITED STATES PATENTS

| | | |
|---|---|---|
| 1,303,714 | O'Brien | May 13, 1919 |
| 1,745,310 | Novick | Jan. 28, 1930 |
| 2,384,490 | Plum et al. | Sept. 11, 1945 |
| 2,457,444 | Cave | Dec. 28, 1948 |
| 2,487,085 | Wridge | Nov. 8, 1949 |
| 2,508,237 | Eserkaln et al. | May 17, 1950 |
| 2,651,533 | Miller | Sept. 8, 1953 |